(12) United States Patent
Nash (10) Patent No.: US 10,402,766 B1
(45) Date of Patent: Sep. 3, 2019

(54) SYSTEMS, METHODS, AND APPARATUS FOR OPERATIONS SIMULATION, VISUALIZATION, AND IMPROVEMENT

(71) Applicant: The Boeing Company, Chicago, IL (US)

(72) Inventor: Michael W. Nash, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 123 days.

(21) Appl. No.: 14/076,090

(22) Filed: Nov. 8, 2013

(51) Int. Cl.
*G06Q 10/00* (2012.01)
*G06Q 10/06* (2012.01)

(52) U.S. Cl.
CPC ....... *G06Q 10/0633* (2013.01); *G06Q 10/067* (2013.01); *G06Q 10/06393* (2013.01)

(58) Field of Classification Search
CPC .............. G06Q 10/06; G06Q 10/0631; G06Q 10/06316; G06Q 10/063; G06Q 10/06313; G06Q 10/06375; G06Q 10/20; G06Q 10/06393; G06Q 10/067
See application file for complete search history.

(56) References Cited

U.S. PATENT DOCUMENTS

| | | | | |
|---|---|---|---|---|
| 6,591,182 B1* | 7/2003 | Cece | ........................ | F02C 9/00 477/30 |
| 6,907,416 B2* | 6/2005 | Tasooji | .............. | G05B 23/0232 706/14 |
| 7,349,825 B1* | 3/2008 | Williams | ............... | G06Q 10/06 702/182 |
| 7,865,385 B2* | 1/2011 | Maple | ................ | G06Q 10/0631 705/500 |
| 8,340,948 B1* | 12/2012 | Song et al. | ........................ | 703/6 |
| 8,594,932 B2* | 11/2013 | McIver | .................. | G01C 23/00 701/117 |
| 2004/0015381 A1* | 1/2004 | Johnson | ............... | G06Q 10/063 705/7.37 |
| 2010/0138368 A1* | 6/2010 | Stundner | .............. | G06N 99/005 706/12 |

(Continued)

OTHER PUBLICATIONS

Bergmann, R., & Gil, Y. (2012). Similarity assessment and efficient retrieval of semantic workflows. Information Systems, 115-127. (Year: 2012).*

*Primary Examiner* — William S Brockington, III
(74) *Attorney, Agent, or Firm* — Kwan & Olynick LLP (57) ABSTRACT

Systems, methods, and apparatus are disclosed for visualizing and simulating operational activity and resources associated with an organization, which may be an airline. One or more data values may be aggregated. The data values may identify operational activity information and resource information associated with the organization. Data structures may be generated based on the aggregated one or more data values. Each of the data structures may represent at least part of an operational activity or resource associated with the organization. A process flow data structure may be generated based on the data structures. The process flow data structure may represent at least some of the operational activity of the organization with respect to time. A report may be generated based on the generated data structures and the generated process flow data structure. The report may identify one or more performance metrics associated with the organization.

22 Claims, 7 Drawing Sheets

(56) References Cited

U.S. PATENT DOCUMENTS

| | | | | |
|---|---|---|---|---|
| 2010/0185475 A1* | 7/2010 | Holle | | 705/7 |
| 2012/0065881 A1* | 3/2012 | McIver | | G01C 23/00 |
| | | | | 701/467 |
| 2012/0245836 A1* | 9/2012 | White | | G08G 5/065 |
| | | | | 701/120 |
| 2012/0283897 A1* | 11/2012 | Barraci et al. | | 701/3 |

* cited by examiner

SYSTEMS, METHODS, AND APPARATUS FOR OPERATIONS SIMULATION, VISUALIZATION, AND IMPROVEMENT

TECHNICAL FIELD

This disclosure generally relates to vehicles and machinery and, more specifically, to computer simulations of organizational operations.

BACKGROUND

An airline or other large commercial or non-commercial enterprise may include different functional groups. Conventional methods for modeling the operations of airlines and other large enterprises may include diagrams and representations of specific functional groups within the airline or large enterprise. These representations are limited because they typically focus on particular aspects of the functional groups, and they do not include any other information that may be used to model, simulate or visualize the entire enterprise or organization's operations, such as an airline's fleet and its operations.

SUMMARY

Provided are systems methods and apparatus for the simulation, visualization, and improvement of an organization, such as an airline and its fleet-related operations. A simulation and visualization tool may be provided that enables a user to generate a visual representation of an airline's entire fleet and a temporal representation of its operations. The representation may be a functional model that enables the user to simulate the effects that changes may have on the entire airline. The user may be presented with a visual representation of each change that has been made. Moreover, the representation and simulation may include temporal information that enables the user view the entire fleet with respect to time. These and other features will be described in greater detail herein.

Thus, according to some embodiments, a method for visualizing and simulating operational activities and resources associated with an organization is disclosed. The method may include aggregating one or more data values associated with an organization, the one or more data values identifying operational activity information and resource information associated with the organization; generating, using a processor, one or more data structures based on the aggregated one or more data values, each of the one or more data structures representing at least part of an operational activity or resource associated with the organization; generating, using the processor, a process flow data structure based on the one or more data structures, the process flow data structure representing at least some of the operational activity of the organization with respect to time; and generating, using the processor, a report based on the generated one or more data structures and the generated process flow data structure, the report identifying one or more performance metrics associated with the organization.

In various embodiments, the one or more data structures may comprise a plurality of types of data structures, each of the plurality of types being selected from the group consisting of: a module data structure, a phase data structure, an activity data structure, and a task data structure. At least one of the one or more data structures may have a user-defined dependency upon a designated data structure. In some embodiments, the organization is an airline or non-commercial aviation entity, the module data structure represents a process or operation selected from the group consisting of: a flight, a maintenance event, and a ground turn. The phase data structure represents a phase of a process or operation selected from the group consisting of: a pre-flight phase, a taxi event, takeoff, a climbing phase, a cruising phase, a descent phase, a landing event, and deplaning. The activity data structure represents an activity performed during a phase, the activity being selected from the group consisting of: serve drinks, serve meals, clean cabin, preparing for landing, gathering equipment, reviewing a manual, reviewing a service history, performing maintenance, and inspecting an element of an airplane. The task data structure represents a task performed by an actor or resource, the task being selected from the group consisting of: preparing for arrival and post-flight check.

In particular embodiments, the method further includes generating, using a rendering engine, a graphical representation of operations, activities, and resources associated with the airline or non-commercial aviation entity based on at least one of the data structures. The graphical representation may be a user interface screen provided via a web-based application. The method may further include: receiving a modification of the one or more data values; and regenerating the one or more data structures and the process flow data structure, the regenerated process flow data structure displaying one or more effects of the received modification. The one or more performance metrics may be determined based on the received modification, and the report may identify and quantify the one or more performance metrics that were determined based on the received modification. Furthermore, the report may include a recommendation of one or more changes that may be made to the organization. The recommendation may be based on an analysis of historical data aggregated from one or more previous iterations of generating the process flow data structure. The one or more performance metrics may be selected from the group consisting of: operational time, fuel efficiency, consumption of resources, customer satisfaction, and requirement of crew or staff.

In various embodiments, a system is disclosed that includes a storage device configured to store information aggregated from a plurality of information sources. The system may also include a processor configured to: aggregate one or more data values associated with an organization, the one or more data values identifying operational activity information and resource information associated with the organization, the one or more data values being stored on the storage device; generate, using a processor, one or more data structures based on the aggregated one or more data values, each of the one or more data structures representing at least part of an operational activity or resource associated with the organization; generate, using the processor, a process flow data structure based on the one or more data structures, the process flow data structure representing at least some of the operational activity of the organization with respect to time; and generate, using the processor, a report based on the generated one or more data structures and the generated process flow data structure, the report identifying one or more performance metrics associated with the organization.

In various embodiments, one or more computer readable media are disclosed that may have instructions stored thereon for performing a method, the method comprising: aggregating one or more data values associated with an organization, the one or more data values identifying operational activity information and resource information associated with the organization; generating, using a processor, one or more data structures based on the aggregated one or more data values, each of the one or more data structures representing at least part of an operational activity or resource associated with the organization; generating, using the processor, a process flow data structure based on the one or more data structures, the process flow data structure representing at least some of the operational activity of the organization with respect to time; and generating, using the processor, a report based on the generated one or more data structures and the generated process flow data structure, the report identifying one or more performance metrics associated with the organization.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Conventional methods of analyzing airline operations do not visualize and analyze parallel operating activities that may occur within an airline. For example, conventional methods may focus on a single aspect of a single flight that a plane makes. Furthermore, conventional methods do not track or account for data relating to flight operations and temporal data associated with the airline's operations. Accordingly, a user attempting to model the operations of the entire airline's fleet is not able to view performance improvements across the entire fleet or a temporal representation of airline operations across the fleet. Furthermore, airlines do not have a non-intrusive means of assessing the integrated costs and benefits associated with the acquisition of a new product or service aimed at operational performance improvements.

Various systems, methods, and apparatus are disclosed herein that present a user or client with a model of an organization, which may be an airline or non-commercial aviation entity, that displays a representation of the entire fleet's operations, displays temporal information associated with those operations, and further displays what effects any modifications and optimizations have on the airline's operations. In various embodiments, data about the airline may be aggregated and used to generate a model of operations and processes associated with each airplane within the airline's fleet. The model may be used to provide the user with a graphical representation of the fleet's operations and a model that may be used to simulate any changes that the user makes. Thus, a visualization and simulation tool may be provided that is a web-based software application that enables the user to model, interact with, and visualize the airline's fleet-wide operational activities and resources with respect to time. The tool enables the user to then explore alternative processes and tools in order to improve overall operational performance of fleet-wide operations of the airline. Furthermore, a report may be generated that identifies and quantifies any benefits conferred by a change or alternative process implemented by the user.

Figure 1:
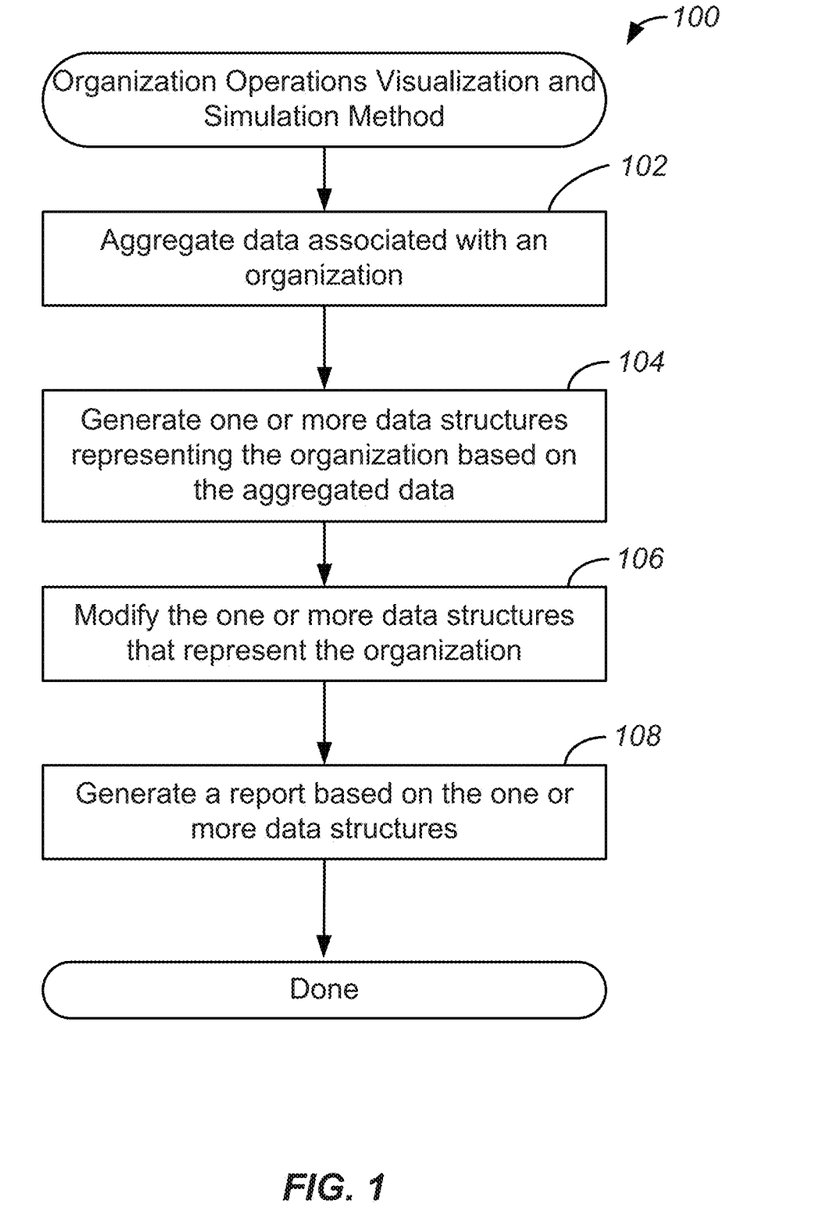
FIG. 1 illustrates a flow chart of an example of a method for visualization and simulation of an organization's operations, implemented in accordance with some embodiments.

FIG. 1 illustrates a flow chart of an example of a method 100 for visualization and simulation of an organization's operations, implemented in accordance with some embodiments. As similarly discussed above, a simulation and visualization tool may be provided that enables a user to generate a visual representation of an airline's entire fleet. Moreover, the representation may be a functional model that enables the user to simulate effects changes may have on the airline, and be presented with a visual representation of the change. Moreover, the representation and simulation may include temporal information that enables the user view the entire fleet with respect to time.

Accordingly, at 102, data associated with an organization may be aggregated. In various embodiments, the organization may be an airline or non-commercial aviation entity. The data may be any operational activity information and resource information relevant to the airline that may be retrieved from any data source. The data may describe the operations, processes, and structure of the airline. For example, the aggregated data may describe all planes in the airline's fleet, operational and schedule information for each plane, operational and schedule information for each airport associated with each plane, and similar information for any vendor or service provider associated with the airline. Thus, the aggregated data may provide a complete set of data that describes the airline, its operations, and the context, which may be business or environmental, in which the airline operates.

At 104, one or more data structures representing the organization may be generated based on the aggregated data. In various embodiments, the aggregated data may be arranged into data structures to generate an organized, sorted, and filterable representation of an airline. For example, the aggregated data may be used to generate a view of the entire airline's fleet that shows a chronological representation of all operations and procedures associated with each plane. The view may be rendered and presented to a user on a display device of a computer system.

At 106, the one or more data structures representing the organization may be modified. In some embodiments, the user may modify one or more parameters associated with the aggregated data that underlies the generated data structures associated with the organization, which may be an airline. Thus, the user may simulate how changes impact the entire airline's fleet by changing one or more parameters, and observing the impact the change has on the rendered view.

For example, the user may simulate an increase in maintenance times at a particular airport. A data value corresponding to the maintenance time will be updated, the generated data structures will be updated, and the chronological representation for each plane will be updated such that the user is dynamically provided a representation of how the increased maintenance time will affect the airline's fleet in real time.

At 108, a report may be generated based on the one or more data structures. In various embodiments, the report may identify various performance metrics associated with the organization. Moreover, the report may summarize the impact of the changes that were made to the organization, which may be an airline. The report may identify the change, which may be the introduction of a new piece of equipment or a new procedure. The report may also quantify what benefits and drawbacks resulted from the implementation of the change. The report may also provide the user with additional recommended changes that the user may make to achieve one or more additional benefits in the airline's fleet, such as decreased fuel costs and increased customer satisfaction.

Figure 2:
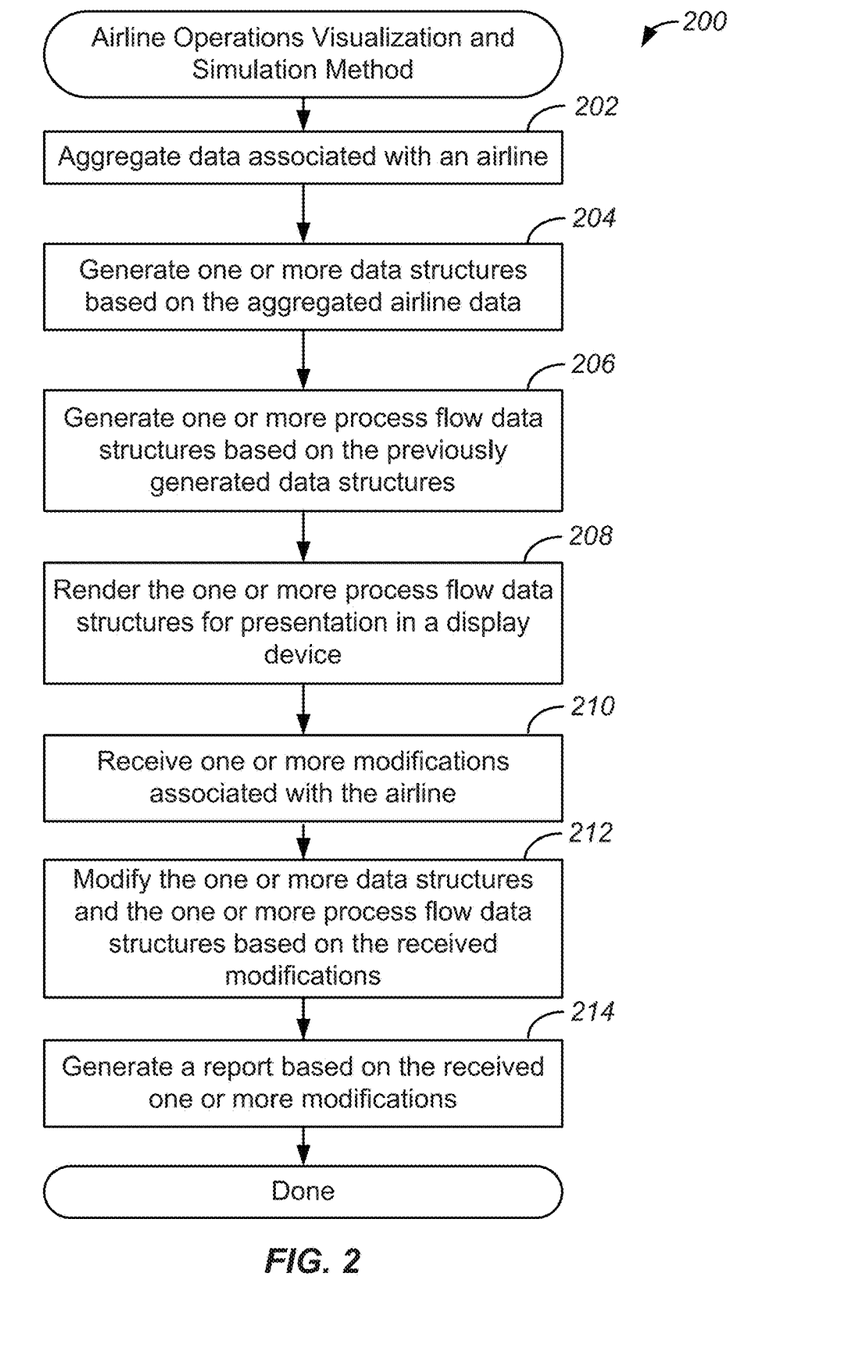
FIG. 2 illustrates a flow chart of an example of a method for visualization and simulation of airline operations, implemented in accordance with some embodiments.

FIG. 2 illustrates a flow chart of an example of a method for visualization and simulation of airline operations, implemented in accordance with some embodiments. As similarly discussed above with reference to FIG. 1, method 200 may enable a user to generate a visual representation of an airline's entire fleet that is also a functional model that simulates the effects that changes may have on the airline. In various embodiments, several different types of data structures may be generated to represent temporal aspects of the fleet's operations at different levels of granularity. Relationships and dependencies between the data structures may be user-defined, thus enabling the user to configure one or more temporal aspects of the visualization and simulation.

Accordingly, at 202, data associated with an airline may be aggregated. In various embodiments, the data includes one or more data values that represent information specific to the airline's operations and resources. Thus, the data may be used to configure a model or simulation to accurately reflect or represent the airline and its operations. For example, the data associated with the airline may include data related to, describing, or identifying the airline's procedures before, during, and after a flight. The data may identify tasks performed, an amount of time taken per task, an actor or owner associated with a task, any dependencies related to the task, and any related tasks. The data may also identify other operational parameters associated with the airline, such as training requirements, a training schedule, preferred schedules or providers of maintenance, and preferred locations of maintenance. The data may also include information about the airline itself, such as how many employees the airline has.

In various embodiments, the data is aggregated from a user who may be a customer or client from the airline. Thus, one or more components of a computer system may be configured to generate a user interface and present the user with a user interface screen in which the user may enter information and data associated with the airline. The user interface may include one or more text fields, drop down boxes, and templates in which the user may enter data. The information entered by the user may be stored in one or more data structures in a database system. In some embodiments, the information may be stored in an account specific to that user or specific to the airline.

In some embodiments, a data aggregator may be used to aggregate data associated with the airline. The data aggregator may be configured to search and crawl data available from one or more data sources or information resources, such as databases, networks, and the Internet. The data aggregator may search for information, such as flight numbers, flight schedules, departure and arrival locations, weather conditions, customer satisfaction surveys or reviews, similar information associated with the airline's partners, and other operational information, such as flight times and delays. The data identified and returned by the data aggregator may be retrieved and stored in a database along with the data entered by the user. In some embodiments, the user may be presented with a user interface screen configured to enable the user to approve or prohibit the inclusion of one or more data values of the retrieved data.

At 204, one or more data structures may be generated based on the aggregated airline data. The model or simulation of the airline may include one or more predetermined and generic data structures or templates which may be configured specifically for a particular airline in order to model and simulate the operations of that airline and the planes within its fleet. In various embodiments, there may be several different types of data structures which each represent, at least in part, part of an operational activity associated with the airline. Each type of data structure may be configured to represent a particular type of information. For example a data structure named "module" may represent an entire sequence of events that occurs during a flight of an airplane. A data structure named "phase" may represent a particular phase or stage of the sequence of events in the module. A data structure named "activity" may represent a specific activity within a phase. Furthermore, a data structure named "task" may represent specific task performed within one or more activities. The different data structures may be configured to include one or more data fields configured to store data values input by a user or aggregated by the data aggregator. Furthermore, the data structures may also be configured to include one or more data fields configured to store information or data identifying associations with and dependencies from other data objects.

Thus, sequences of operations associated with an airline's fleet may be represented in various different levels of granularity by using different types of data objects. For example a module data structure may represent a particular airplanes flight from a first destination to a second destination. The module data structure may include information such as a departure location, an arrival location, a flight time, a departure time, a flight number, and the equipment or plane used. The module data structure may have multiple associated phase data structures which represent particular phases of the flight, such as pre-flight, taxi, takeoff, climb, cruise, descent, landing, taxi, and deplane. Each of the phase data structures may have multiple associated activity data structures. For example the phase data structure of preflight might be associated with activities, such as pre-flight safety check, and obtain ground clearance. Furthermore, each activity data structure may be associated with task data structures. For example, the activity data structure landing preparation may be associated with tasks, such as cabin check and cockpit check. Additional examples of the different types of data structures are discussed in greater detail with reference to FIG. 3.

In various embodiments, the data aggregated at 202 is included in one or more data structures to generate data structures specific to the airline. In some embodiments, the data structures may be configured by the user. Accordingly, the user may use a user interface screen to select different types of data structures and enter data into the data fields of the data structures. Returning to a previous example, a module data structure may have data fields configured to store a flight number or name, an origin, a destination, a duration, and equipment used during the flight. The user may enter data values such as flight number 1754, SEA, TKO, 4:35, and 737-800, respectively. In some embodiments, the data may be input automatically based on one or more identifiers associated with the aggregated data. For example, an airline may identify flight numbers with a particular data value or identifier. In response to detecting or identifying the identifier, one or more components of a computer system may autofill data fields in data structures matching that particular identifier.

In various embodiments, a user may also define various parameters associated with the data structures. For example, the user may determine an order or duration of various phases within a module, the user may assign an actor or an owner to a particular task, and the user may define equipment required to perform a particular task. The user may also define dependencies or precedence relationships associated with the data structures. For example, a user may configure different activities such that boarding cannot occur prior to cleaning and de-boarding of previous passengers. Additional details of precedence relationships are described in greater detail with reference to FIG. 4.

At 206, one or more process flow data structures may be generated based on the previously generated data structures. In various embodiments, a process flow data structure is a data structure that is configured to provide a temporal representation of some or all data included in the model or simulation of the airline. Thus, the data structures generated at 204 may be assembled into a single process flow data structure to provide a unified view of the data structures that displays temporal relationships between the data structures. For example, at 204, a first module data structure may have been generated to represent a first flight of a particular plane. Furthermore, a second module data structure may have been generated to represent a second flight of the same plane. Based on a first and second departure time data value included in each of the modules respectively, a system component may identify which module occurred first, and may arrange the modules such that the first module is positioned before the second module. This may be performed for all generated data structures and filtered based on a particular plane, such that the process flow data structure includes a chronological arrangement of all data structures for each aircraft or airplane within the airline's fleet. An example of a process flow data structure is discussed in greater detail below with reference to FIG. 5.

In various embodiments, the arrangement of the data structures may be performed based on previously identified dependencies or precedences defined by the user. For example, a data structure, such as a first task, may identify another data structure, such as a second task, that must precede it. Based on this defined precedence, a system component may arrange the second task before the first task within the process flow data structure. In some embodiments, this might not be possible because there might not be sufficient time, or one or more other conditions, such an equipment or personnel requirement, might not be met or might be violated. In such a situation, a system component, such as the rendering engine, may be configured to generate and render an error message that includes one or more data values identifying the data structure that could not be placed or arranged, and further identifying the rule or reason which prevented placing or arranging the data object.

In various embodiments, the scope or amount of data represented by a process flow data structure may be determined or configured by a user. For example, a user may provide an input to a system component, such as the rendering engine, that indicates that data structures associated with all airplanes in the airline's fleet should be rendered and modeled. In another example, the input provided by the user may indicate that data structures for only a single plane should be rendered and modeled. In yet another example, the input provided by the user may indicate that data structures associated with a single flight of a particular plane should be rendered and modeled. Therefore, the process flow data structure may model or represent as little or as much of the airline's fleet and operations as the user desires.

At 208, the one or more process flow data structures may be rendered for presentation in a display device of a computer system. Thus, the one or more process flow data structures generated at 206, may be rendered into a format appropriate for display in a display device. During the process of rendering, additional information may be added or included to the data structures to modify the presentation of the data structures. Thus, graphical representations and icons may be added for particular types of data and for particular users or clients to provide additional contextual information to the users or clients. For example, if the user is associated with a particular airline, logos and color themes may be imported from a database or central repository of data and imported into the data structure. In this way, the presentation of the process flow data structure may be customized based on the user's context, which may be defined by the user's company or airline. Furthermore, graphical images may be imported for particular types of data. For example, if the data structure includes a flight listing the equipment as a Boeing® 787, a graphical icon of a top view of a Boeing® 787 may be imported from a database and incorporated in the rendered presentation of the flight.

In various embodiments, the rendered process flow data structure is configured to receive one or more inputs from a user, and further configured to be dynamically rendered in response to receiving the one or more inputs. In this way, the user may expand upon or drill down into processes and modules as well as add or remove processes and models from the rendered presentation. For example, when presented with the rendered presentation of the process flow data structure, a user may provide an input which may select or identify a module data structure that is currently displayed. In response to receiving the input, the rendered presentation may be dynamically re-rendered to include underlying data structures, which may be phase data structures. Moreover, the input may cause additional data structures to be included in the rendered presentation, or may cause some data structures to be removed from the rendered presentation.

In some embodiments, the rendering engine may also be configured to generate one or more reports or user interface screens configured to represent a filterable view of all of the data structures generated at 204. Thus, the rendering engine may be configured to filter and render views of the data structures based on one or more parameters of the data objects themselves. For example, the data structures may be filtered based on type. In this example, a user may select only task data structures to be presented. Thus, in response to receiving the selection, one or more system components, such as a rendering engine, may identify, retrieve, and render for presentation all task data structures that were generated.

Furthermore, if any error messages were generated at 206, they may be rendered and presented at 208.

At 210, one or more modifications associated with the airline may be received. In various embodiments the modifications may be changes or alterations made to one or more data values that were initially aggregated at 202, and used to generate data structures at 204. The modifications may be provided by the user or client to whom the process flow data structure is presented. Thus, in response to being presented with a rendered presentation of the process flow data structure, the user may change and modify various data values and parameters to determine what effect or consequence such changes may have. In various embodiments, the user interface that is presented to the user may be configured to receive one or more inputs that identify the user's modifications. Accordingly, the user interface may receive an input provided by the user, and changes may be made to the data values underlying the previously generated data structures.

At 212, the one or more data structures and the one or more process flow data structures may be modified based on the received one or more modifications. Thus, in response to receiving a modification from the user, one or more system components may automatically change the appropriate data values in the under lying data structures, rearrange the data structures and update the process flow data structure to convey the most recent data values, and re-render the presentation of the process flow data structure. In this way, a user may modify one or more parameters associated with the process flow data structure that the user is viewing and be dynamically presented with an updated presentation of the process flow data structure. This dynamic configuration and rendering of the process flow data structure enables the user to change parameters, such as a flight time, maintenance time, boarding time, or equipment requirement, and view the impact of each change on the entire fleet's operations in real time.

In various embodiments, the change or modification input by the user is the simulated implementation of a particular tool, piece of equipment, or process. For example, the process flow data structure may initially be generated and rendered using a conventional method of maintaining an engine implemented on a Boeing® 777. However, Boeing® may develop an improved method for maintaining the engine. The new method may result in reduced maintenance times. In various embodiments, the user interface may present the user with an input field configured to receive a selection from the user. The user may select the new and improved maintenance method by clicking a button, entering text into a text field, or selecting an item from a drop down box. In response to receiving the selection, one or more system components may re-generate the process flow data structure and re-render the presentation of the process flow data structure. Thus, the presentation of the process flow data structure may be updated to show the time saved for each plane by implementing the improved maintenance method.

In various embodiments, one or more system components, such as a recommendation engine, may be configured to recommend one or more products or processes to apply to the user's process flow data structure. In some embodiments, the recommendation engine may be configured to recommend a product or solution based on historical data gathered from other iterations of the process flow data structure generation method that may have been performed previously for other clients or users. For example, other users who have used the process flow simulation system may have made one or more changes to increase efficiencies in their simulations of their respective airline. The data values, parameters, outcomes, and changes associated with those simulations may be stored in a database system as a historical database.

In some implementations, the recommendation engine may use one or more pattern recognition algorithms to identify similar process flow data structures in the historical database, and to identify what changes or modifications were made in those identified process flow data structures. For example, the recommendation engine may identify several previous simulations of process flow data structures that were previously run for other users whose airlines service the same airports. The recommendation engine may query the historical database, identify any relevant previous simulations based on the pattern recognition algorithms, identify the changes made by those users, and provide the identified changes to the user as a recommendation. For example, for users whose airplanes fly through three particular airports, the users may have discovered that the first airport provides landing gear maintenance the fastest because it has implemented a new maintenance procedure. Accordingly, the users may have changed their process flows to perform landing gear maintenance at the first airport. The recommendation engine may identify those previous simulations based on similarities between routes. The recommendation may identify the change in the maintenance schedule, and provide the identified change to the current user as a recommendation. The user may then determine whether or not to implement recommended change. If the user does implement the change, the process flow data structure may be updated and re-rendered and the user may be provided with the results of the improvement dynamically and in real-time. In some embodiments, the recommendation may be approved by an expert prior to being implemented in the simulation. Thus, a resident or domain expert may review the recommendations and provide them to the user.

Furthermore, the presentation of the recommended changes may be configured based on one or more preferences identified by the user. In some embodiments, the user may identify one or more performance metrics that are most important to the user's airline. For example, the user may place most value on the performance metrics of fuel cost and satisfaction of customers. Therefore, if the recommendation engine identifies several recommended changes, they may be ranked or sorted based on the metrics identified by the user. Thus, the products or services that result in the greatest increases in user-identified metrics may be ranked highest, while the products or services that result in the least increases in user-identified metrics may be ranked lowest.

At 214, a report may be generated based on the received one or more modifications. In various embodiments, the report provides a summary or synopsis of the changes that were made and the benefits that resulted from those changes. Thus, multiple performance metrics may be calculated based on the iterations of the process flow data structure, and the user may be presented with graphical representation of the multiple metrics across multiple intervals. In this way, the report may clearly identify one or more products that were implemented in the user's airline, and may further identify a quantified representation of the benefit conferred to the user's airline by the implementation of that product.

For example, if a new product was implemented that resulted in decreased maintenance times, the report may be presented to the user as a dashboard that indicates an amount of time saved for each airplane over the course of a day and over the course of a year. Furthermore, the dashboard may indicate how much value or money was saved as a result of the reduced maintenance times based on a predetermined relationship between time and money. The values of time saved may be calculated by one or more system components by comparing one or more data values identifying the time taken in a simulation run prior to implementing the new product with one or more data values identifying the time taken in a simulation run after implementing the new product. The difference between the data values may be the time saved. Similar reports may be generated for other products and various other benefits that may result from each product such as increased fuel efficiency, reduced consumption of resources, increased customer satisfaction, and reduced requirement of crew or staff.

While method 200 has been described with reference to airplanes and the aerospace industry, it will be appreciated that the embodiments disclosed herein may be applied to any other context as well, such as automotive, railroad, and other mechanical and vehicular contexts.

Figure 3:
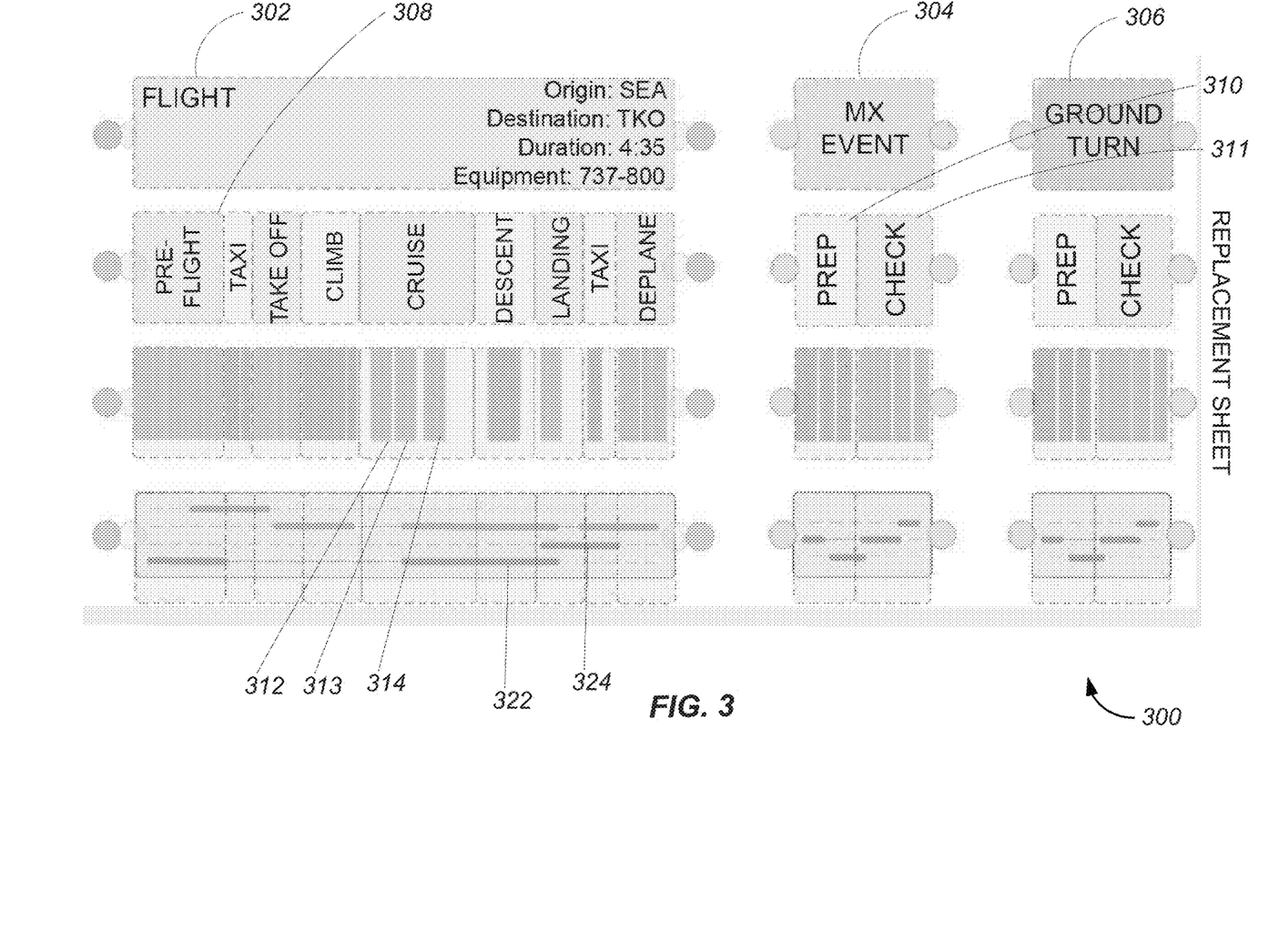
FIG. 3 illustrates an example of an image of a user interface screen that may present one or more data structures, in accordance with some embodiments.

FIG. 3 illustrates an example of an image of a user interface screen that may present one or more data structures, in accordance with some embodiments. As similarly discussed above with reference to FIG. 2, the data structures displayed in image 300 may be module data structures, phase data structures, activity data structures, and task data structures. The data structures may be generated based on the aggregated data and data provided by a user. In some embodiments, the rendered representations of the data structures may be presented to the user prior to generation of the process flow data structure. As discussed in greater detail below with reference to FIG. 4 and FIG. 5, one or more parameters associated with the data structures, such as a duration and order, may be modified. Furthermore, temporal parameters may be modified as well. For example, times and events can be synchronized with coordinated universal time (UTC).

Accordingly, a module data structure may be presented, such as module data structure 302, which may be a data structure that represents a flight taken by a specific plane. Module data structure 302 may include one or more data fields configured to store and display data about an airplane process or operation, such as a flight. In this instance, module data structure 302 identifies the flight status as normal with no disruptions, a location of origin, a departure location, a flight duration, and equipment used for the flight. Module data structures may represent other processes or operations associated with an aircraft, such as module data structure 304 which represents a maintenance event, and module data structure 306 which represents a ground turn used to turn the aircraft while on the ground.

A phase data structure may also be presented, such as phase data structure 308, which may be a data structure that represents a phase of a flight taken by the plane. Phase data structure 308 may include one or more data fields configured to store and display data about the phase of the flight that it represents. In this instance, phase data structure 308 includes an identifier labeled "pre-flight." Phase data structures may represent other phases of a flight, such as a taxi event, takeoff, a climbing phase, a cruising phase, a descent phase, landing, another taxi event, and deplaning. Phase data structures may also represent phases of other processes or operations such as phase data structure 310, which represents a preparation phase of a maintenance event module, and phase data structure 311, which represents a checking phase of the maintenance event module.

In some embodiments, an activity data structure may also be presented, such as activity data structure 312, which may be a data structure that represents an activity taken during a phase of a flight taken by the plane. Activity data structure 312 may include one or more data fields configured to store and display data about the activity that it represents that is to be taken in a particular phase of the flight. In this instance, activity data structure 312 includes an identifier labeled "serve drinks" and is to be taken or performed during the phase labeled "cruise." Activity data structures may represent other activities taken during the cruise phase of a flight, such as activity data structure 313 which represents the activity "serve meals," and activity data structure 314 which represents the activity "clean cabin." In another example, the phase "descent" may include the activity of preparing for landing. In yet another example, the phase "prep" of a maintenance event module may include data structures representing the activities related to preparing to perform maintenance, such as gathering equipment, reviewing a manual, and reviewing a service history. The phase "check" of the maintenance event module may include activities relating to performing the maintenance, such as inspecting a first element and inspecting a second element.

A task data structure may also be presented, such as task data structure 322 which represents the task of preparing for arrival. As shown by task data structure 322 and task data structure 324, which represents the task of post-flight check, a task data structure may be limited to a single activity or phase, or it may span multiple activities or phases. Thus, a task data structure may be more representative of an entire task performed by a person, crew, or piece of equipment, while an activity may be more representative of a particular part or portion of a process. Accordingly, the task may have an associated person, owner, or piece of equipment which may have several defined limitations, such as requiring a predetermined amount of time to arrive on site and only having a certain number available at a particular airport. In this instance task data structure 322 may be a task performed by the pilot, and task data structure 324 may be a task performed by a flight attendant.

Figure 4:
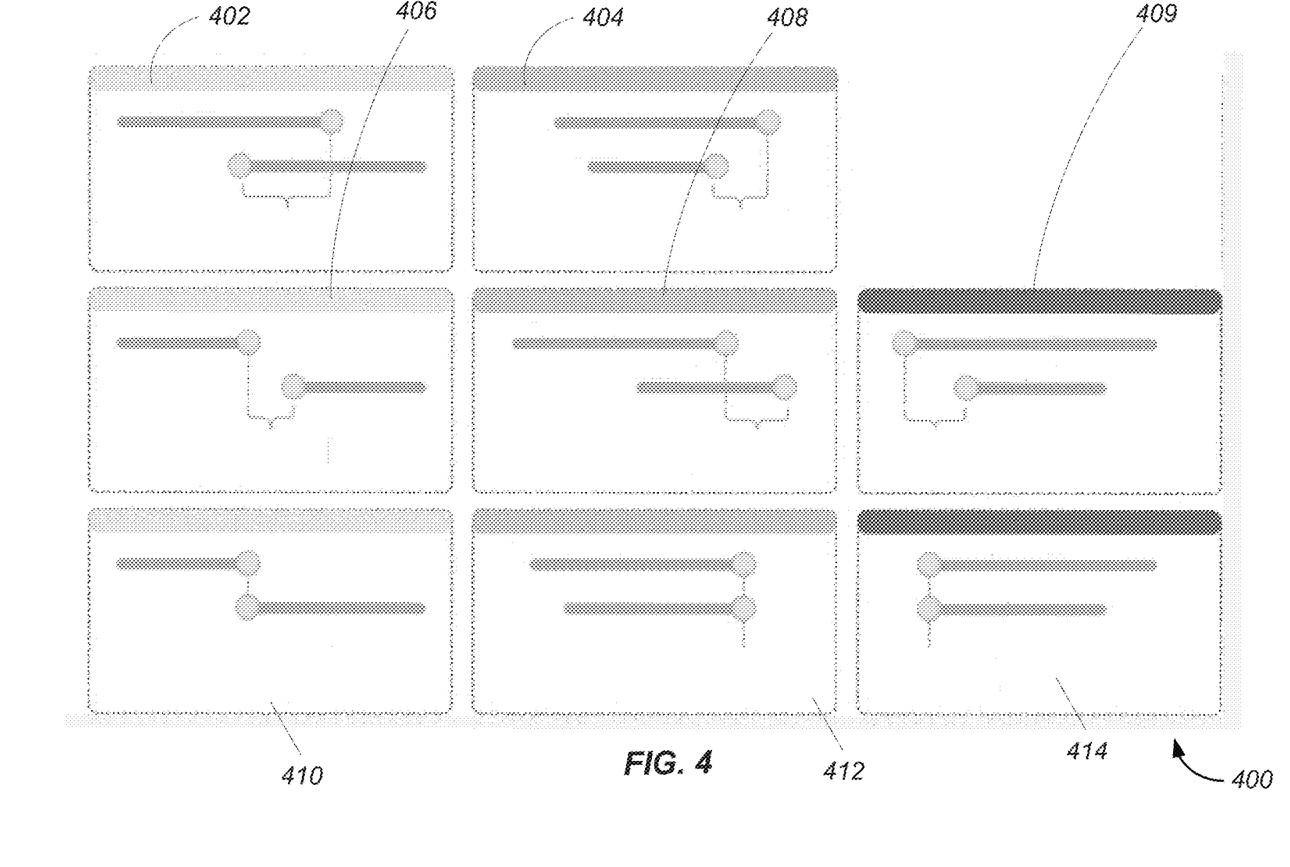
FIG. 4 illustrates an example of one or more dependencies or precedence relationships which may be defined for a data structure, in accordance with some embodiments.

FIG. 4 illustrates an example 400 of one or more dependencies or precedence relationships which may be defined for a data structure, in accordance with some embodiments. Dependencies and precedence relationships may be used to define relationships between one or more data structures. For example, after a flight has taken place, the crew may need to de-board the passengers before they can clean the cabin. Furthermore, they may need to clean the cabin before they can board passengers for the next flight. In another example, baggage cannot be loaded onto the plane before baggage handlers have arrived on site. In yet another example, if a module data structure representing a flight is to depart at a specified time, a pre-flight module data structure may be required before it. Furthermore, the dependency or precedence relationship may define an actor or equipment component that may be required. Returning to the previous example, the pilot may be required to perform the pre-flight module.

Accordingly, various different types of relationships may be defined. For example, relationship 402 may be used to define an end-to-start negative offset between a start point of a first data structure and an end point of a second data structure. The negative offset may define a minimum amount of time prior to the termination of a first duration of a data structure that a second data structure must begin. Relationship 404 may be used to define an end-to-end negative offset which may define a minimum amount of time a duration of a first data structure must end prior to the end point of a duration of a second data structure. Relationship 406 may be used to define an end-to-start positive offset which may define a minimum amount of time after which a data structure may begin. Relationship 408 may be used to define an end-to-end positive offset which may define a minimum amount of time after the termination of a duration of a first data structure that a second data structure may end. Relationship 409 may be used to define a start-to-start positive offset which may define a minimum amount of time after the start of a duration of a first data structure that a duration of a second data structure may begin. Relationship 410 may be used to define an end-to-start point which may be common point with no offset such that a duration of a first data structure ends, and a duration of a second data structure begins. Relationship 412 may be used to define a mutual endpoint for two or more data structures. Relationship 414 may be used to define a mutual start point for two or more data structures.

It will be appreciated that any of the above described offsets and/or relationships may be applied to any type of data structure. For example a first task data structure representing the task "fuel plane" and a second task data structure representing the task "obtain ground clearance" may be configured to have a mutual start point with the phase "pre-flight." In this way, temporal relationships between all data structures may be configured, defined, and subsequently modified to simulate one or more different conditions.

Figure 5:
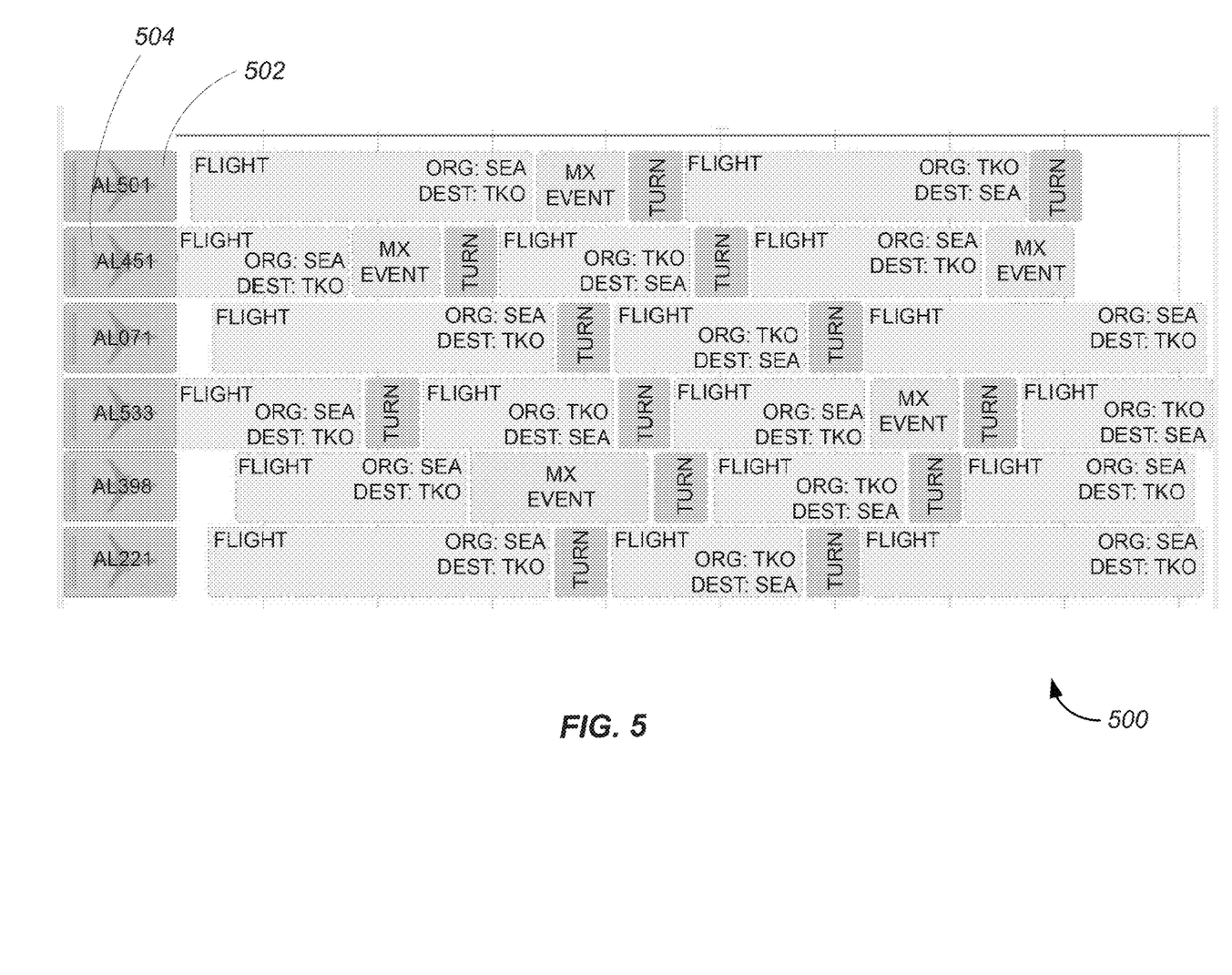
FIG. 5 illustrates an example of an image of a user interface screen that may present a rendered process flow data structure, in accordance with some embodiments.

FIG. 5 illustrates an example of an image of a user interface screen that may present a rendered process flow data structure, in accordance with some embodiments. Accordingly, image 500 illustrates an image of the entire process flow data structure for an airline's entire fleet. As similarly discussed above with reference to FIG. 2, image 500 may be sorted or arranged based on each airplane included in the airline's fleet. For example, data field 502 may display all module data structures associated with a first plane. In this instance, the plane is identified by the identifier "AL501." Data field 502 includes a chronological presentation of the modules proceeding from left to right. For example, flight AL501 first flies from Seattle to Tokyo, has a scheduled maintenance event, undergoes a ground turn, and proceeds on a round trip. Presented below data field 502, data field 504 displays similar information for flight AL451. Similar information is simulated and presented for each plane in the fleet.

As similarly discussed above with reference to FIG. 1 and FIG. 2, one or more parameters or data values may be changed based on a change that the user may want to simulate. Such a change may be any of a variety of events or conditions, such as the implementation of new equipment, a new maintenance procedure, a new in-flight procedure, a weather delay, an equipment failure, a change in a personnel or equipment requirement, or a traffic control delay. In response to a change or modification of one of these parameters, the entire process flow data structure may be re-generated and re-rendered. Accordingly, image 500 may be dynamically updated and provide the user with a modified representation of the user's fleet in real time.

In various embodiments, a system component, such as a rendering engine, may provide other features and functionalities to image 500. For example, time scale 506 may be rendered and presented along a side or axis of image 500. Moreover, if additional data structures or planes cannot be rendered in a single image, the rendering engine may include scroll bars that allow the user to scroll through the additional data structures.

Figure 6:
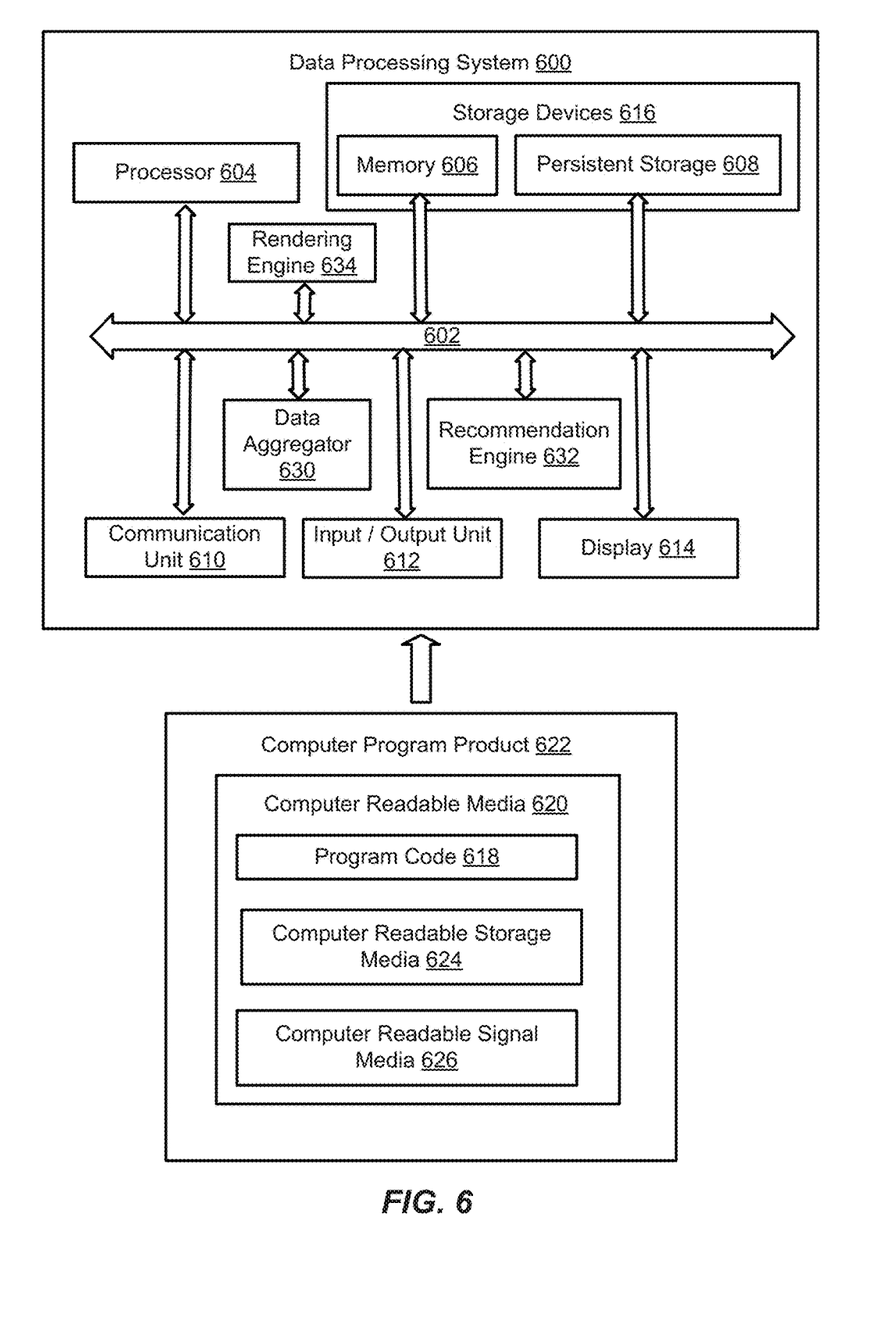
FIG. 6 illustrates a data processing system configured in accordance with some embodiments.

FIG. 6 illustrates a data processing system configured in accordance with some embodiments. Data processing system 600 may be used to implement one or more processing components or computers used in the systems described above. In some embodiments, data processing system 600 includes communications framework 602, which provides communications between processor unit 604, memory 606, persistent storage 608, communications unit 610, input/output (I/O) unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these illustrative examples. Memory 606, in these examples, may be, for example, a random access memory or any other suitable volatile or non-volatile storage device. Persistent storage 608 may take various forms, depending on the particular implementation. For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card. In various embodiments, communications unit 610 may be configured to communicate with a database system, such as a historical database configured to store one or more data values of one or more process flow data structures.

Data aggregator 630 may include hardware and software configured to query one or more data sources, identify one or more results based on one or more data values, and retrieve the identified one or more results. Data aggregator may be further configured to store the retrieved data in a storage device.

Recommendation engine 632 may include hardware and software configured to scan data, such as data stored in a historical database system, analyze the data using one or more pattern recognition algorithms, which may be any conventional pattern recognition algorithms, and identify one or more data values based on the pattern recognition algorithms. Thus, recommendation engine 632 may include hardware to provide connectivity to other portions of data processing system 600 and to external databases. Recommendation engine 632 may further comprise processing hardware and software configured to apply the pattern recognition algorithms to retrieved data, and further configured to generate a result object based on the results of the application of the algorithms.

Rendering engine 634 may include any combination of software and hardware configured to translate or convert a data structure, such as a process flow data structure, into a data structure capable of being displayed on a display device of a computer system. Thus, rendering engine 634 may be configured to add additional graphical data and provide the appropriate formatting for the target device upon which the data structure is to be displayed.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these illustrative examples. In one example, computer readable media 620 may be computer readable storage media 624 or computer readable signal media 626.

In these illustrative examples, computer readable storage media 624 is a physical or tangible storage device used to store program code 618 rather than a medium that propagates or transmits program code 618.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code 618.

Figure 7:
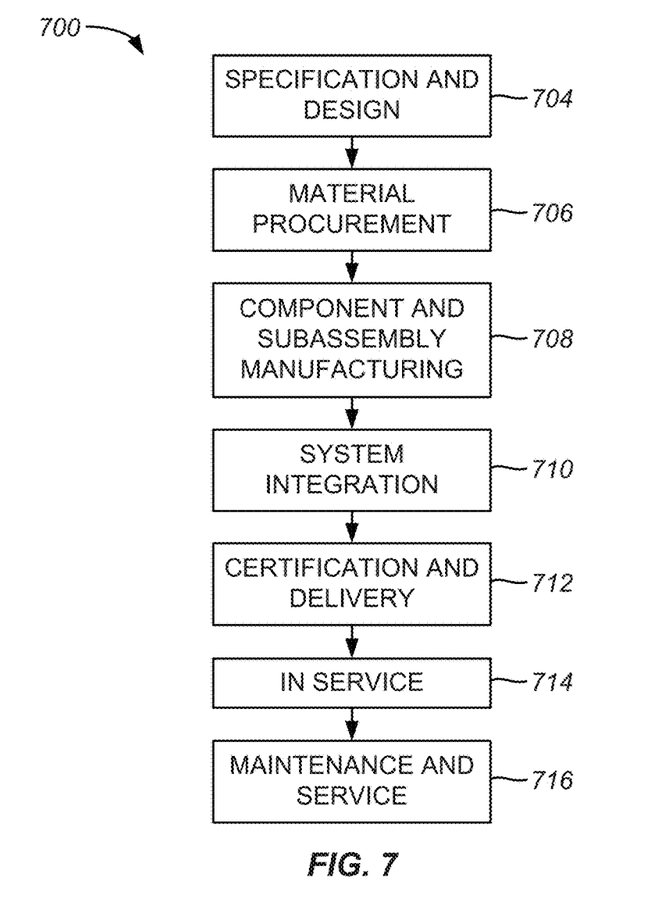
FIG. 7 illustrates a flow chart of an example of an aircraft production and service methodology, in accordance with some embodiments.
Figure 8:
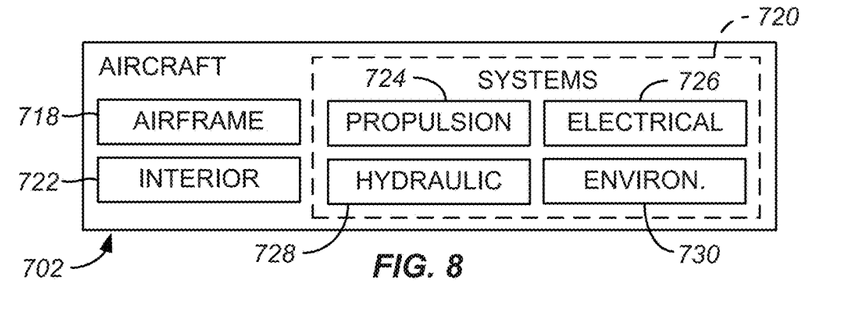
FIG. 8 illustrates a block diagram of an example of an aircraft, in accordance with some embodiments.

Embodiments of the disclosure may be described in the context of an aircraft manufacturing and service method 700 as shown in FIG. 7 and an aircraft 702 as shown in FIG. 8. During pre-production, illustrative method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine maintenance and service 716 (which may also include modification, reconfiguration, refurbishment, and so on).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 702 produced by illustrative method 700 may include an airframe 718 with a plurality of systems 720 and an interior 722. Examples of high-level systems 720 include one or more of a propulsion system 724, an electrical system 726, a hydraulic system 728, and an environmental system 730. Any number of other systems may be included. Although an aerospace example is shown, the principles of the invention may be applied to other industries, such as the automotive industry.

Apparatus and methods embodied herein may be employed during any one or more of the stages of the production and service method 700. For example, components or subassemblies corresponding to production process 708 may be fabricated or manufactured in a manner similar to components or subassemblies produced while the aircraft 702 is in service. Also, one or more apparatus embodiments, method embodiments, or a combination thereof may be utilized during the production stages 708 and 710, for example, by substantially expediting assembly of or reducing the cost of an aircraft 702. Similarly, one or more of apparatus embodiments, method embodiments, or a combination thereof may be utilized while the aircraft 702 is in service, for example and without limitation, to maintenance and service 716.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A method comprising:
   aggregating one or more data values associated with an organization, the one or more data values identifying operational activity information and resource information associated with the organization, wherein the organization is an airline, and wherein at least some of the one or more data values are retrieved automatically;
   generating, using a processor of a recommendation engine, one or more data structures based on the aggregated one or more data values, each of the one or more data structures representing at least part of an operational activity or resource associated with, at least in part, maintenance operations of the airline;
   generating, using the processor, a process flow data structure based on the one or more data structures and an input received at a user interface, the process flow data structure representing at least some of the operational activity and the maintenance operations of the airline represented by the one or more data structures, the process flow data structure further representing a first temporal relationship between at least some of the one or more data structures, and further representing a second temporal relationship between one or more types of maintenance operations and one or more types of flight operations associated with airplane engine repair operations, the process flow data structure being presented on the user interface;

generating, using the processor, a report based on the generated one or more data structures and the generated process flow data structure, the report identifying one or more performance metrics associated with the organization; and dynamically generating, using the processor of the recommendation engine, a real-time indication of an implemented change, wherein the implemented change represents updates to maintenance times of the one or more types of maintenance operations and further represents changes to fleet-wide operations that are based, at least in part, on the updated maintenance times, wherein the user interface is updated to represent and display the implemented change, wherein the implemented change is identified and implemented based, at least in part, on one or more additional changes associated with one or more additional process flow data structures, wherein the one or more additional process flow data structures are identified based on similarities specific to the one or more types of maintenance operations implemented within the process flow data structure, and wherein the one or more additional changes are identified based on previous changes made to the one or more types of maintenance operations implemented within additional process flow data structures.

2. The method of claim 1, wherein the one or more data structures comprise a plurality of types of data structures, each of the plurality of types being selected from the group consisting of: a module data structure, a phase data structure, an activity data structure, and a task data structure, and wherein at least one of the one or more data structures has a user-defined dependency upon a designated data structure.

3. The method of claim 2,
wherein the module data structure represents a process or operation selected from the group consisting of: a flight, a maintenance event, and a ground turn,
wherein the phase data structure represents a phase of the process or operation selected from the group consisting of: a pre-flight phase, a taxi event, takeoff, a climbing phase, a cruising phase, a descent phase, a landing event, and deplaning,
wherein the activity data structure represents an activity, the activity being selected from the group consisting of: serve drinks, serve meals, clean cabin, preparing for landing, gathering equipment, reviewing a manual, reviewing a service history, performing maintenance, and inspecting an element of an airplane, and
wherein the task data structure represents a task performed by an actor or resource, the task being selected from the group consisting of: preparing for arrival and post-flight check.

4. The method of claim 3 further comprising: generating, using a rendering engine, a graphical representation of operations, activities, and resources associated with the airline or non-commercial aviation entity based on at least one of the one or more data structures.

5. The method of claim 4, wherein the graphical representation is included in the user interface, and is provided via a web-based application.

6. The method of claim 1 further comprising:
receiving a modification of the one or more data values; and
regenerating the one or more data structures and the process flow data structure, the regenerated process flow data structure displaying one or more effects of the received modification.

7. The method of claim 6, wherein the one or more performance metrics are determined based on the received modification, and wherein the report identifies and quantifies the one or more performance metrics that were determined based on the received modification.

8. The method of claim 1, wherein the report includes a recommendation of one or more changes that may be made to the organization.

9. The method of claim 8, wherein the recommendation is based on an analysis of historical data aggregated from one or more previous iterations of generating the process flow data structure.

10. The method of claim 1, wherein the one or more performance metrics are selected from the group consisting of: operational time, fuel efficiency, consumption of resources, customer satisfaction, and requirement of crew or staff.

11. The method of claim 1 further comprising:
sending the report to at least one recipient associated with the organization, the sending comprising transmitting the report to a network-accessible storage device such that the report may be accessed by the at least one recipient.

12. A system comprising:
a storage device configured to store information aggregated from a plurality of information sources: and
a processor of a recommendation engine configured to:
aggregate one or more data values associated with an organization, the one or more data values identifying operational activity information and resource information associated with the organization, wherein the organization is an airline, and wherein at least some of the one or more data values are retrieved automatically, the one or more data values being stored on the storage device:
generate, using the processor, one or more data structures based on the aggregated one or more data values, each of the one or more data structures representing at least part of an operational activity or resource associated with, at least in part, maintenance operations of the airline;
generate, using the processor, a process flow data structure based on the one or more data structures and an input received at a user interface, the process flow data structure representing at least some of the operational activity and the maintenance operations of the organization airline represented by the one or more data structures, the process flow data structure further representing a first temporal relationship between at least some of the one or more data structures, and further representing a second temporal relationship between one or more types of maintenance operations and one or more types of flight operations associated with airplane engine repair operations, the process flow data structure being presented on the user interface;
generate, using the processor, a report based on the generated one or more data structures and the generated process flow data structure, the report identifying one or more performance metrics associated with the organization; and dynamically generate a real-time indication of an implemented change, wherein the implemented change represents updates to maintenance times of the one or more types of maintenance operations and further represents changes to fleet-wide operations that are based, at least in part, on the updated maintenance times, wherein the user interface is updated to represent and display the implemented change, wherein the implemented change is identified and implemented based, at least in part, on one or more additional changes associated with one or more additional process flow data structures, wherein the one or more additional process flow data structures are identified based on similarities specific to the one or more types of maintenance operations implemented within the process flow data structure, and wherein the one or more additional changes are identified based on previous changes made to one or more types of maintenance operations implemented within the additional process flow data structures.

13. The system of claim 12, wherein the one or more data structures comprise a plurality of types of data structures, each of the plurality of types being selected from the group consisting of: a module data structure, a phase data structure, an activity data structure, and a task data structure, and wherein at least one of the one or more data structures has a user-defined dependency upon a designated data structure.

14. The system of claim 13,
wherein the module data structure represents a process or operation selected from the group consisting of a flight, a maintenance event, and a ground turn,
wherein the phase data structure represents a phase of the process or operation selected from the group consisting of: a pre-flight phase, a taxi event, takeoff, a climbing phase, a cruising phase, a descent phase, a landing event, and deplaning,
wherein the activity data structure represents an activity performed during a phase, the activity being selected from the group consisting of: serve drinks, serve meals, clean cabin, preparing for landing, gathering equipment, reviewing a manual, reviewing a service history, performing maintenance, and inspecting an element of an airplane, and
wherein the task data structure represents a task performed by an actor or resource, the task being selected from the group consisting of: preparing for arrival and post-flight check.

15. The system of claim 12, wherein the processor is further configured to:
receive a modification of the one or more data values; and
regenerate the one or more data structures and the process flow data structure, the regenerated process flow data structure displaying one or more effects of the received modification.

16. The system of claim 15, wherein the one or more performance metrics are determined based on the received modification, and wherein the report identifies and quantifies the one or more performance metrics that were determined based on the received modification.

17. The system of claim 12, wherein the one or more performance metrics are selected from the group consisting of: operational time, fuel efficiency, consumption of resources, customer satisfaction, and requirement of crew or staff.

18. The system of claim 12 further comprising: a network-accessible storage device, wherein the processor is further configured to send the report to at least one recipient associated with the organization by transmitting the report to the network-accessible storage device such that the report may be accessed by the at least one recipient.

19. One or more non-transitory computer readable media having instructions stored thereon for performing a method, the method comprising:
aggregating one or more data values associated with an organization, the one or more data values identifying operational activity information and resource information associated with the organization, wherein the organization is an airline, and wherein at least some of the one or more data values are retrieved by the airline automatically;
generating, using a processor, one or more data structures based on the aggregated one or more data values, each of the one or more data structures representing at least part of an operational activity or resource associated with, at least in part, maintenance operations of the airline;
generating, using the processor, a process flow data structure based on the one or more data structures and an input received at a user interface, the process flow data structure representing at least some of the operational activity and the maintenance operations of the organization airline represented by the one or more data structures, the process flow data structure further representing a first temporal relationship between at least some of the one or more data structures, and further representing a second temporal relationship between one or more types of maintenance operations and one or more types of flight operations associated with airplane engine repair operations, the process flow data structure being presented on the user interface;
generating, using the processor, a report based on the generated one or more data structures and the generated process flow data structure, the report identifying one or more performance metrics associated with the organization; and
dynamically generating a real-time indication of an implemented change, wherein the implemented change represents updates to maintenance times of the one or more types of maintenance operations and further represents changes to fleet-wide operations that are based, at least in part, on the updated maintenance times, wherein the user interface is updated to represent and display the implemented change, wherein the implemented change is identified and implemented based, at least in part, on one or more additional changes associated with one or more additional process flow data structures, wherein the one or more additional process flow data structures are identified based on similarities specific to the one or more types of maintenance operations implemented within the process flow data structure, and wherein the one or more additional changes are identified based on previous changes made to the one or more types of maintenance operations implemented within additional process flow data structures.

20. The one or more computer readable media recited in claim 19, wherein the one or more data structures comprise a plurality of types of data structures, each of the plurality of types being selected from the group consisting of: a module data structure, a phase data structure, an activity data structure, and a task data structure, and wherein at least one of the one or more data structures has a user-defined dependency upon a designated data structure.

21. The one or more computer readable media recited in claim 20,
- wherein the module data structure represents a process or operation selected from the group consisting of a flight, a maintenance event, and a ground turn,
- wherein the phase data structure represents a phase of the process or operation selected from the group consisting of: a pre-flight phase, a taxi event, takeoff, a climbing phase, a cruising phase, a descent phase, a landing event, and deplaning,
- wherein the activity data structure represents an activity performed during a phase, the activity being selected from the group consisting of: serve drinks, serve meals, clean cabin, preparing for landing, gathering equipment, reviewing a manual, reviewing a service history, performing maintenance, and inspecting an element of an airplane, and
- wherein the task data structure represents a task performed by an actor or resource, the task being selected from the group consisting of: preparing for arrival and post-flight check.

22. The one or more computer readable media recited in claim 19, wherein the method further comprises:
- receiving a modification of the one or more data values; and
- regenerating the one or more data structures and the process flow data structure, the regenerated process flow data structure displaying one or more effects of the received modification.

* * * * *